May 18, 1937.　　　A. B. WOOD　　　2,080,883
PRODUCTION OF LIME FROM OYSTER SHELLS
Filed May 5, 1936
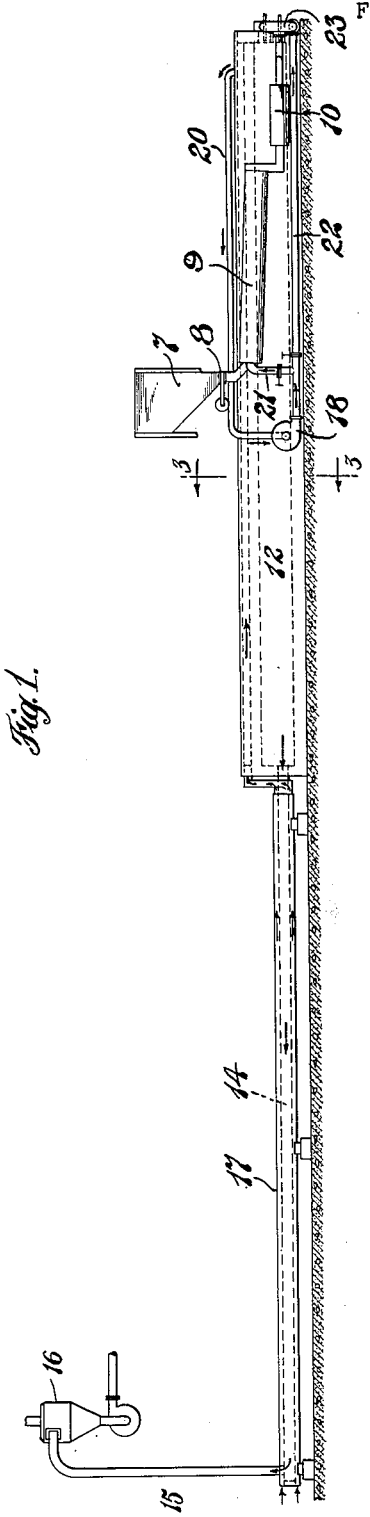
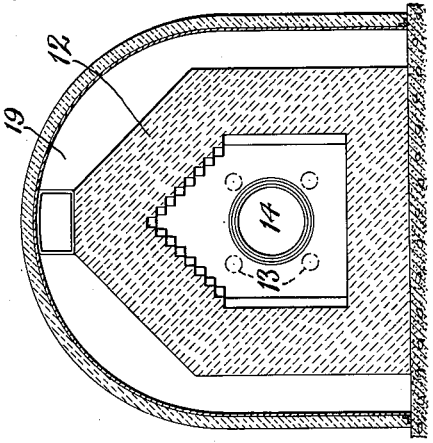
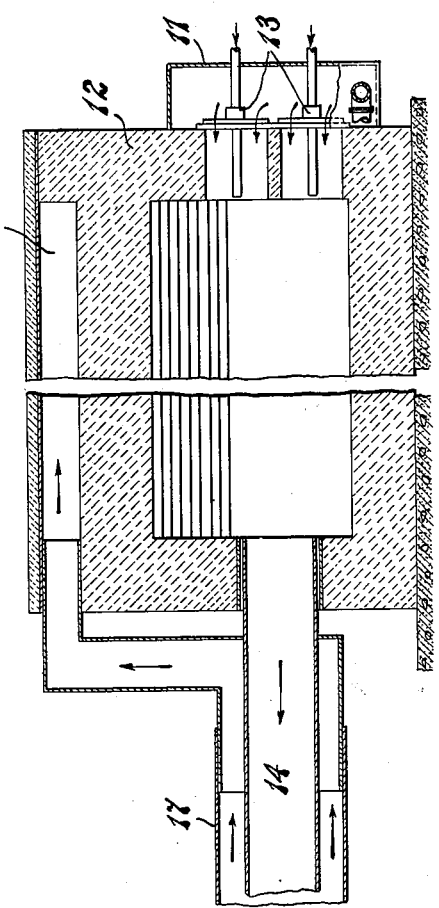
INVENTOR
A. B. Wood
BY
ATTORNEYS Patented May 18, 1937

2,080,883

UNITED STATES PATENT OFFICE 2,080,883

PRODUCTION OF LIME FROM OYSTER SHELLS

Albert B. Wood, New Orleans, La.

Application May 5, 1936, Serial No. 77,921

5 Claims. (Cl. 263—53)

This invention relates to the production of lime from oyster shells and the like and it has for its primary object the provision of an improved process which is simple and economical in operation and which gives a very high yield of a product of uniformly good quality.

Other objects and advantages will appear hereinafter or be readily understood by those skilled in the art.

One form of apparatus suitable to carrying out my invention is illustrated in the accompanying drawing, wherein—

Figure 1 is a more or less diagrammatic side elevation of apparatus suitable for carrying out my invention.

Figure 2 is an enlarged broken-out section through a kiln employed for carrying out the invention, and Figure 3 is an enlarged section taken on the line 3—3 of Figure 1.

I am aware that it has heretofore been proposed to produce caustic lime from lime rock or from oyster shells, for example, by such instrumentalities as rotary kilns. According to my process, speaking generally, I comminute the oyster shells into fine particles, as, for example, by grinding in a suitable mill. The particles are then delivered into a suitable calcining furnace or vessel having an atmosphere sufficiently hot so as to break up the calcium carbonate ($CaCO_3$) into caustic lime (CaO) and carbon dioxide ($CO_2$), the size of the particles and the construction of the furnace being such that the reaction is substantially complete while the particles are still in space. The reaction products are then separated in any known manner, as by means of a cyclone separator.

The preferred way of carrying out the process is as follows, reference being had to the accompanying drawing. The oyster shells are delivered to the bin or hopper 7 from which they are discharged at a determined rate by means of any suitable feeder mechanism 8 into the rotary dryer 9 in which the surface moisture of the shells is removed. From the dryer the dried shells pass into a ball or other suitable grinding mill 10 in which they are ground to a suitable state of fineness, say, for example, to about 100 mesh. As will be later described, the drying is accomplished by means of a current of hot air delivered into the dryer, this air passing on through the ball mill and picking up the particles which have been ground to the required fineness. From the mill the ground particles are carried to the casing 11 by the carrying air and are delivered into the kiln 12. If gas be the fuel used, it is supplied through a suitable number of burners 13, together with primary air for combustion. The carrying air for the ground particles provides a portion of the secondary air, additional air being admitted in any suitable manner. The kiln 12 is preferably about 150 feet in length and the flumeway is preferably of 7 square feet, with the width of about 3½ feet. The entering particles contact immediately with the flame and are carried along with the products of combustion through the flumeway, reaction being substantially completed by the time the end of the flumeway is reached. The velocity maintained within the flumeway is sufficient to maintain the particles in suspension in the gaseous products of combustion. For 100 mesh fineness the velocity is preferably about 10 feet per second. The temperature within the flumeway near the entrance end is about 2500° F. and the temperature of the flue gas at the exit end of the flumeway is about 1500° F.

The flue gas and with it the solid particles carried in suspension (now in the form of caustic lime), on leaving the kiln, enter a relatively small pipe or conduit 14, about 20 inches in diameter. This conduit is about 150 feet long and the velocity therein is also sufficient to maintain the solid particles in suspension. The flue gases enter the conduit at about 1500° F. and at the discharge end of the conduit have a temperature of about 500°. The flue gas and suspended particles leave the conduit by means, for example, of a vertical pipe 15 in which the velocity is about 2800 feet per minute, and are delivered into a cyclone separator 16 and the lime is blown into storage tanks, the carbon dioxide and other gases being allowed to escape into the air.

Surrounding the conduit 14 is a casing or shell 17 of somewhat larger diameter so as to provide an annular space around the conduit through which air is sucked by the fan 18. The conduit is thus insulated and at the same time serves as a means for preheating the air for its subsequent use in the dryer and for the combustion of the fuel.

The kiln is also jacketed and the air leaving the preheater is drawn through the chamber 19 and from thence passes to the fan as by means of the pipe 20. The air is thus heated to about 1000° F. and on leaving the fan 18 a portion thereof is delivered to the dryer 9 by means of the damper controlled pipe 21, the remainder being by-passed to the casing or air box 11 by means of the damper controlled pipe 22. By regulation of the dampers the air supply can be regulated both as to quantity and as to the amount respectively delivered to the dryer and to the by-pass. An additional fan 23 may be provided for ensuring draft for the mill.

I do not limit myself to the dimensions and proportions of parts described nor to the velocities mentioned. For material of a fineness which will pass through 100 mesh, I have found the velocities and proportion of parts suitable to give satisfactory results.

The advantage of heating the shell particles in space is that substantially all the particles will be uniformly heated, which is not the case in devices such as rotary kiln hereinbefore mentioned and in which some of the particles are under-burnt and others are over-burnt. By my process I secure a maximum efficiency with a product of uniformly good quality. The process is expeditious.

As the finely divided particles of the raw material are fed to the hot gases, the chemical action (which is endothermic), takes up a certain amount of heat from the gases and they, therefore, have a tendency to shrink in volume. This is balanced to some extent by the carbon dioxide which is liberated so that the tendency is to maintain an approximately uniform velocity in the flume.

Furthermore, the process is one which lends itself readily to effective control of operating conditions so that the likelihood of under-burning or over-burning is greatly minimized. This control may be had by placing thermometers at suitable points along the flumeway. The character and extent of chemical reaction taking place can readily be determined through the temperature indications and the quantity of fuel controlled to suit the rate of delivery of the raw material, or the rate of the feed of raw material regulated in relation to the fuel feed, or both fuel and material feed may be altered.

For all practical purposes the amount of carbon dioxide liberated will serve to maintain substantial uniformity of velocity so as to insure the particles remaining in suspension. If for any reason this should be insufficient, other expedients may be resorted to, to secure the needed velocity throughout.

By providing the air heater and by jacketing the kiln I minimize heat losses and recover heat which would otherwise be lost and return the same back into the system with the air introduced. At the same time I obtain the heat required for removing surface moisture.

The separator fan draws the gaseous products of combustion through the kiln and air preheater conduit.

I claim:

1. The process of producing lime from oyster shells which comprises finely comminuting the shells, delivering the comminuted shells to a fuel and flame stream confined in an extended passage of relatively small area, the size of the particles and the velocity of the fuel and flame stream and of the resultant gases being such that the particles are carried in suspension, the heat being sufficient to break down the calcium carbonate into caustic lime and carbon dioxide but below the melting point of caustic lime and the length of travel being sufficient to complete such reaction in space, controlling the heat to prevent over or under burning of the particles of caustic lime, and delivering the said particles in suspension to a mechanical separator wherein the caustic lime is separated from the gases.

2. The process of producing lime from oyster shells which comprises comminuting the shells into fine particles, delivering the particles into a confined stream of hot gas to be carried in suspension therein, the heat being sufficient to produce the reaction $CaCO_3 = CaO + CO_2$ but below the melting point of CaO and the time of treatment being sufficient to substantially complete the reaction with the particles in suspension, controlling the heat to prevent over or under burning of the particles, and then separating the solid reaction product from the gases.

3. The process of producing lime from oyster shells which comprises pulverizing the shells so that the particles will pass through an approximately 100 mesh screen, delivering the pulverized shells to a fuel and flame stream confined in an extended passage of relatively small area, the velocity of the fuel and flame stream and of the resultant gases being such that the particles are carried in suspension, the heat being sufficient to break down calcium carbonate into caustic lime and carbon dioxide but below the melting point of caustic lime, controlling the heat to prevent over or under burning of the particles, and delivering the particles in suspension to a mechanical separator for separating the solids from the gases.

4. The process of producing lime from oyster shells which comprises finely comminuting the shells, delivering the comminuted shells to a fuel and flame stream confined in an extended passage of relatively small area, the temperature at the entrance end of which is about 2500° F. and the temperature at the exit end of which is about 1500° F., maintaining the velocity of said stream sufficient to carry such particles in suspension, the length of the passage being sufficient to complete the reaction $CaCO_3 = CaO + CO_2$ while the particles are in suspension, controllably maintaining said temperatures, and delivering the mixed products of reaction to a mechanical separator.

5. The process of producing lime from oyster shells which consists in finely comminuting the shells, delivering the particles into a relatively extended passage of relatively small cross-sectional area, delivering fuel and air into said passage to provide a fuel and flame stream therein in which the particles are carried in suspension, controlling the delivery of the particles and of the fuel and air relatively to one another to maintain a temperature sufficient to produce the reaction $CaCO_3 = CaO + CO_2$ without over burning or under burning, the length of travel being sufficient to complete said reaction while the particles are in suspension, and delivering the resultant caustic lime particles in suspension into a separator in which the solids are separated from the gases.

ALBERT B. WOOD.